Sept. 16, 1947.        O. C. ECKEL        2,427,392
CLIP
Filed Nov. 25, 1944

INVENTOR.
Oliver C. Eckel
BY Harold E. Cole
Attorney

Patented Sept. 16, 1947

2,427,392

UNITED STATES PATENT OFFICE 2,427,392

CLIP

Oliver C. Eckel, Belmont, Mass.

Application November 25, 1944, Serial No. 565,079

1 Claim. (Cl. 85—28)

This patent application is a continuation in part of my pending patent application Patent No. 2,365,629, issued December 19, 1944.

This invention relates to clips of the nail type, which are suitable to hold material such as insulation in place on the ceiling or wall of a building.

The principal object of my invention is to provide a clip having a slender but firm penetrating part that can be driven through hard insulating material. It is particularly adapted where the finish to be applied on the insulation requires metal lath reinforcing that is attached to the clip.

Another object is to so construct said clip that its base can be attached independently of the penetrating portion, so that work can be performed while the base is in place, and when ready to apply the insulation the penetrating portion can be secured in the base. A further object is to so construct the base part of the clip that holds said penetrating portion that once it is slid in place it will not have any tendency to slide out at one end.

The foregoing and other objects which will appear as the nature of the invention is better understood, may be accomplished by a construction and arrangement of parts such as is disclosed by the drawings and specification. The nature of the invention is such as to render it susceptible to various changes and modifications, and, therefore, I am not to be limited to said disclosures; but am entitled to all such changes therefrom as fall within the scope of my claim.

Figure 1:
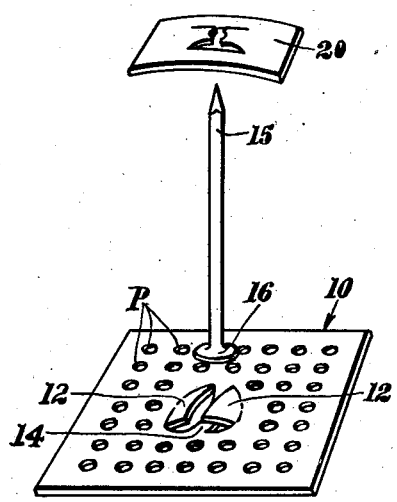
Figure 1 is a perspective view of the base and penetrating portion of my clip before they are assembled, and also of a washer to fit over said penetrating point.
Figure 2:
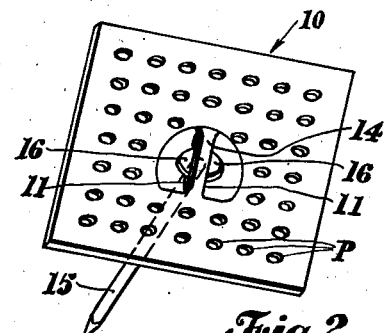
Figure 2 is a perspective view of my clip looking at the inner face of the base, which inner face is ready to be cemented to a ceiling or wall.
Figure 3:
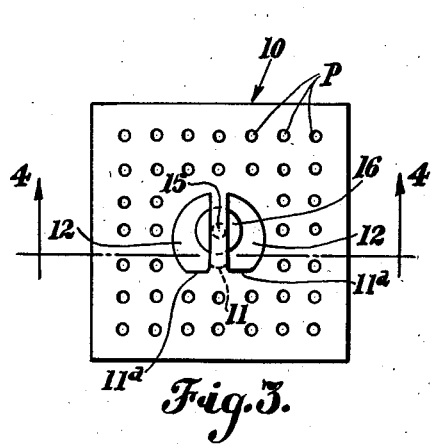
Figure 3 is a plan view of my clip looking at the outer face of the base.

As illustrated my clip has a base 10 that is preferably flat and of sheet metal with perforations P therein. Two slits or openings 11 are made in said base, which extend in parallel lines so that the space that separates them is substantially the same. Said slits 11 are formed by slitting through and forcing portions of said base 10 to offset position to thereby provide retaining covers or offset portions 12 which, as shown in Figure 2 of the drawings, appear in the form of segments of a circle, but with the entrance or front ends truncated as at 11a. Between said slits 11 is a supporting strip 14 which is part of said base 10.

The penetrating shank of my clip has a pin member 15 and an enlarged head 16, preferably flat on both its face surfaces and round at its edge. Said head 16 is slid into place on said base 10 between said two slits 11 at said front ends and bears against said supporting strip 14 of said base. When it reaches a position under and between the extremities of said retaining covers 12, the latter are preferably pounded down on said head 16 to lock it in place.

Figure 4:
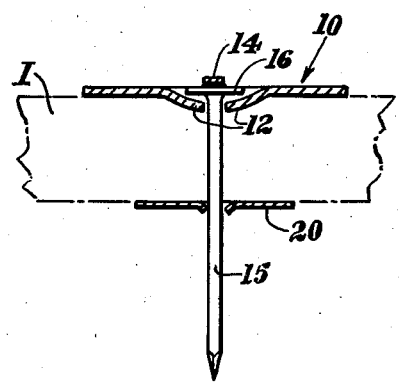
Figure 4 is a sectional view taken on the line 4—4 of Figure 3, the dotted lines indicating the insulation that is held in place by my clip.

In actual use the inner face of said base 10 is usually adhesively united to a ceiling or wall, and said pin member 15 extends through insulation I as shown in Figure 4 of the drawings. A washer 20 may be forced onto said pin member 15 to retain said insulation I in position.

What I claim is:

A clip comprising a base and a shank, said shank embodying a pin member and an enlarged head, said base having two slits therein that extend in substantially parallel lines, and having two side portions offset from said base the inner sides of which are defined by said parallel lines, said head being between said slits and under said offset portions and below said base, said offset portions having outer arcuate surfaces and truncated front ends.

OLIVER C. ECKEL.

REFERENCES CITED

The following references are of record in the file of this patent:

UNITED STATES PATENTS

| Number | Name | Date |
|---|---|---|
| 831,179 | McDonagh | Sept. 18, 1906 |
| 1,721,629 | Jones | July 23, 1929 |
| 2,365,629 | Eckel | Dec. 19, 1944 |